US012173910B2

(12) United States Patent
Garrabrant

(10) Patent No.: US 12,173,910 B2
(45) Date of Patent: Dec. 24, 2024

(54) HYBRID FOSSIL FUEL-ELECTRIC MULTI-FUNCTION HEAT PUMP

(71) Applicant: Stone Mountain Technologies, Inc., Johnson City, TN (US)

(72) Inventor: Michael A. Garrabrant, Unicoi, TN (US)

(73) Assignee: Stone Mountain Technologies, Inc., Johnson City, TN (US)

( * ) Notice: Subject to any disclaimer, the term of this patent is extended or adjusted under 35 U.S.C. 154(b) by 72 days.

(21) Appl. No.: 16/475,193

(22) PCT Filed: Jan. 4, 2018

(86) PCT No.: PCT/US2018/012303
§ 371 (c)(1),
(2) Date: Jul. 1, 2019

(87) PCT Pub. No.: WO2018/129128
PCT Pub. Date: Jul. 12, 2018

(65) Prior Publication Data
US 2019/0353355 A1 Nov. 21, 2019

Related U.S. Application Data

(60) Provisional application No. 62/442,061, filed on Jan. 4, 2017.

(51) Int. Cl.
*F24D 5/12* (2006.01)
*F25B 25/02* (2006.01)
(Continued)

(52) U.S. Cl.
CPC .............. *F24D 5/12* (2013.01); *F25B 25/02* (2013.01); *F24D 2200/123* (2013.01);
(Continued)

(58) Field of Classification Search
CPC .......... F25B 25/02; F25B 25/005; F25B 7/00; F25B 40/02; F24F 3/08
See application file for complete search history.

(56) References Cited

U.S. PATENT DOCUMENTS 3,301,000 A * 1/1967 Holbay .................. F25B 25/02
62/141
3,627,031 A * 12/1971 Ware ..................... F24F 5/0003
165/218

(Continued)

FOREIGN PATENT DOCUMENTS

| CN | 1135255 A | 11/1996 |
| CN | 2581908 Y | 10/2003 |

(Continued)

OTHER PUBLICATIONS

The Extended European Search Report dated Jul. 24, 2020, of counterpart European Application No. 18736401.3.
(Continued)

*Primary Examiner* — Christopher R Zerphey
(74) *Attorney, Agent, or Firm* — DLA Piper LLP (US)

(57) ABSTRACT

A multi-function heating and cooling device, comprising components for an ambient air-coupled sorption heat pump cycle and vapor compression cooling cycle integrated together inside a single enclosure is proposed. The sorption heat pump portion is configured to provide very high heating efficiency, while the vapor compression portion is configured to provide high cooling efficiency. The evaporator coil for the sorption cycle and the condenser coil for the vapor compression cycle are configured to share a common ambient-air fan, saving space and cost. By combining the two heating-cooling systems into a single enclosure with shared components, the total installed cost and outdoor space required is reduced compared to installing separate heating and cooling systems.

14 Claims, 9 Drawing Sheets

(51) Int. Cl.
*F25B 30/02* (2006.01)
*F25B 30/04* (2006.01)
*F25B 40/04* (2006.01)

(52) U.S. Cl.
CPC ............... *F25B 30/02* (2013.01); *F25B 30/04* (2013.01); *F25B 40/04* (2013.01); *F25B 2339/047* (2013.01)

(56) References Cited

U.S. PATENT DOCUMENTS

| | | | | |
|---|---|---|---|---|
| 4,055,964 | A * | 11/1977 | Swenson | F25B 27/00 62/238.4 |
| 4,178,772 | A | 12/1979 | Swenson et al. | |
| 4,189,929 | A * | 2/1980 | Russell | F25B 49/02 62/176.5 |
| 4,471,630 | A * | 9/1984 | Sugimoto | F25B 25/02 62/175 |
| 4,502,292 | A * | 3/1985 | Ares | F24F 3/001 237/2 B |
| 5,533,259 | A * | 7/1996 | Hughes | F28D 1/0476 29/890.043 |
| 5,579,652 | A | 12/1996 | Phillips et al. | |
| 5,953,926 | A * | 9/1999 | Dressler | F24F 3/147 236/44 C |
| 7,765,823 | B2 | 8/2010 | Shiflett et al. | |
| 9,157,667 | B2 * | 10/2015 | Kasuya | F25B 6/04 |
| 9,464,826 | B2 * | 10/2016 | Tsai | F25B 40/02 |
| 9,599,379 | B2 * | 3/2017 | Ha | F28F 9/0275 |
| 9,709,302 | B2 * | 7/2017 | Martin | F25B 15/10 |
| 2012/0247740 | A1 | 10/2012 | Gertner et al. | |
| 2015/0013373 | A1 | 1/2015 | Tsai | |

FOREIGN PATENT DOCUMENTS

| | | |
|---|---|---|
| EP | 1 669 701 A2 | 6/2006 |
| KR | 10-0845554 B1 | 7/2008 |
| KR | 10-1402160 | 6/2014 |

OTHER PUBLICATIONS

The First Office Action dated Dec. 11, 2020, of counterpart Chinese Application No. 201880005930.2, along with an English translation.
The Notification of the Second Office Action dated Nov. 12, 2021, of counterpart Chinese Application No. 201880005930.2, along with an English translation.
The Official Notice for Filing Response dated Dec. 20, 2021, of counterpart Korean Application No. 10-2019-7022515, along with an English translation.
Communication under Article 94(3) EPC dated Feb. 24, 2022, of counterpart European Application No. 18736401.3.
The Decision of Rejection dated Apr. 6, 2022, of counterpart Chinese Patent Application No. 201880005930.2, along with an English translation.
Request for Submission of an Opinion dated Oct. 19, 2022, of counterpart Korean Patent Application No. 10-2019-7022515, along with an English translation.
Request for Submission of an Opinion dated May 25, 2023, of counterpart Korean Patent Application No. 10-2019-7022515, along with an English translation.
Notification of Reexamination dated Jun. 7, 2024, of counterpart Chinese Patent Application No. 201880005930.2, along with a concise English translation.
Written Decision on Registration dated Jan. 28, 2024, of counterpart Korean Patent Application No. 10-2019-7022515, along with an English translation.
Office Action dated Feb. 8, 2024, of counterpart Canadian Patent Application No. 3,049,109.

* cited by examiner

HYBRID FOSSIL FUEL-ELECTRIC MULTI-FUNCTION HEAT PUMP

TECHNICAL FIELD

This disclosure relates to heat pumps, particularly hybrid heat pumps using both sorption and vapor compression thermodynamic cycles.

BACKGROUND

Thermally activated heat pumps (such as absorption or adsorption cycles, collectively sorption) can provide space or water heating and space cooling or refrigeration. Cycle efficiencies (coefficient of performance or COP) range from 0.5 to greater than 1.0 for cooling, and 1.2 to greater than 2.0 for heating.

Due to the very high heating efficiencies, fossil fuel-fired (gas, propane, oil, etc) sorption heat pumps are very attractive and environmentally friendly alternatives for conventional fuel-fired heating equipment, such furnaces or boilers, are limited to COPs less than 1.0. For heating, fuel-fired sorption heat pumps also out-perform vapor compression cycle heat pumps driven by electrical power, especially at outside ambient temperatures less than 32° F. (0° C.).

However, for cooling, the efficiency of vapor compression cycles is much higher than sorption cycles. Even though sorption heat pumps can be reversible (to provide either heating or cooling), the low cooling efficiency results in a negative economic payback during cooling season for the end-user compared to using a conventional electric vapor compression air-conditioner. In addition, the extra components required to make the sorption system reversible (compared to a heating only version) adds cost, complexity and slightly reduces the maximum heating-mode efficiency.

For a building that requires both heating and cooling, the current art (FIG. 1) is to install a fuel-fired furnace or boiler (located inside the building), and an electric vapor compression cycle air conditioner (with the condensing portion located outside the building). The exact mode of delivery of the heating and cooling inside the building varies depending upon whether the system is a forced-air system or hydronic.

The only current viable option when substituting a heating-only sorption heat pump on a building that requires both heating and cooling is to install two separate pieces of equipment outside the building: 1) a fuel-fired sorption heat pump and 2) an electric vapor compression heat pump (FIG. 2). When the building uses forced-air to distribute heating or cooling, the air-handler would include a hydronic heat exchanger connected to the sorption heat pump and an evaporator (A-coil) connected to the vapor compression air-conditioner. This option requires the building owner to purchase two separate heat pumps, both of which must be installed outside the building. The cost and space required to do this may not be practical.

SUMMARY

Figure 1:
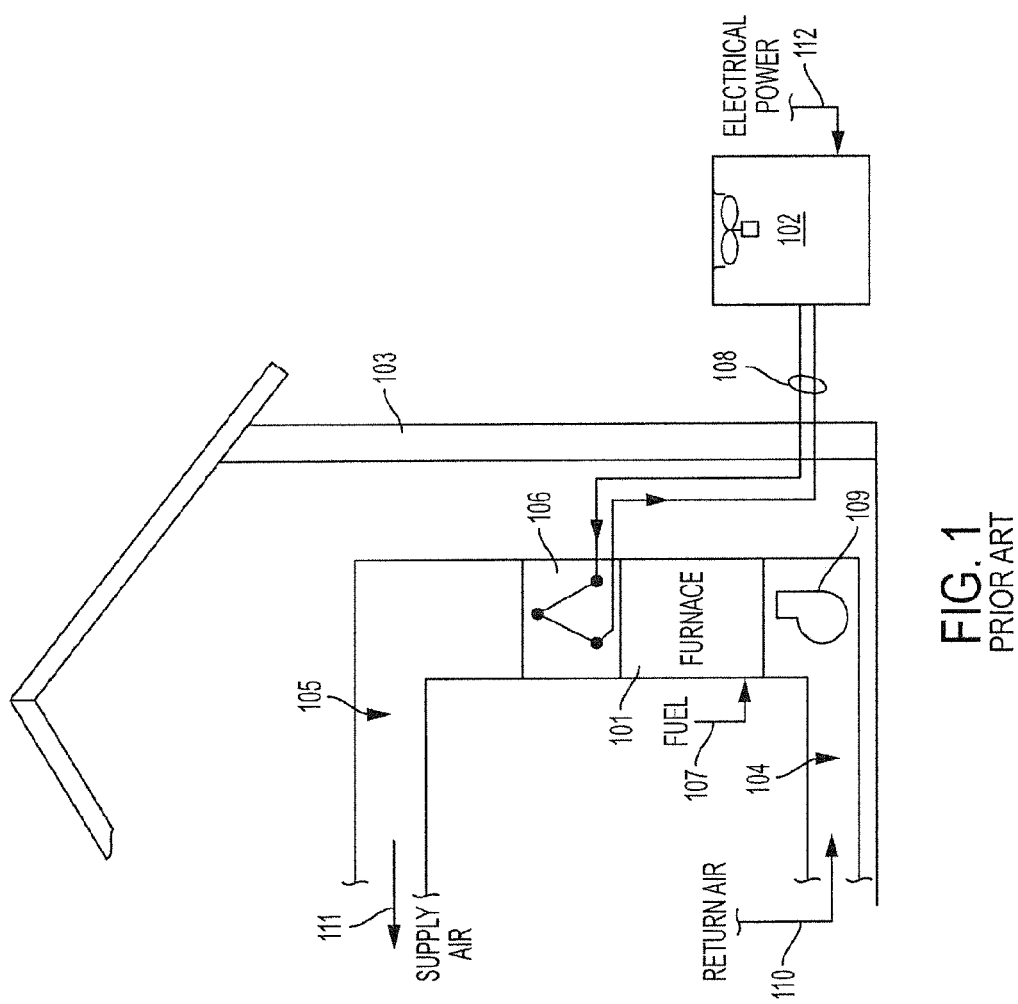
FIG. 1 depicts a typical heating and cooling system for a building, having a fuel-fired furnace and an electric air conditioner.

I provide a heating and cooling system for a building having a hybrid fossil fuel-electric multifunction heat pump consisting of a thermally activated sorption heat pump system for space and/or water heating comprising a desorber, condenser, evaporator and absorber, an electric-powered vapor compression heat pump system comprising a compressor, condenser and evaporator, and an air-moving device that causes air to flow over both the evaporator of the sorption heat pump system and condenser of the vapor compression heat pump system.

DETAILED DESCRIPTION

It will be appreciated that the following description is intended to refer to specific examples of structure selected for illustration in the drawings and is not intended to define or limit this disclosure.

I provide a multi-function heating and cooling device, comprising components for an ambient air-coupled sorption heat pump cycle and vapor compression cooling cycle integrated and nested together inside an enclosure. The sorption heat pump portion may be configured to provide very high heating efficiency, while the vapor compression portion may be configured to provide high cooling efficiency. The evaporator coil for the sorption cycle and the condenser coil for the vapor compression cycle are configured to share a common ambient-air fan, saving space and cost. When space or water heating is desired, the sorption system may operate, heating a hydronic loop connected to indoor heat emitters and/or a storage water tank. When space cooling is desired, the vapor compression system may operate, connected to indoor fan-coil(s) via a hydronic or refrigerant loop. By combining the two heating-cooling systems into a single enclosure with shared components, the total installed cost and outdoor space required is reduced compared to installing separate heating and cooling systems.

Figure 11:
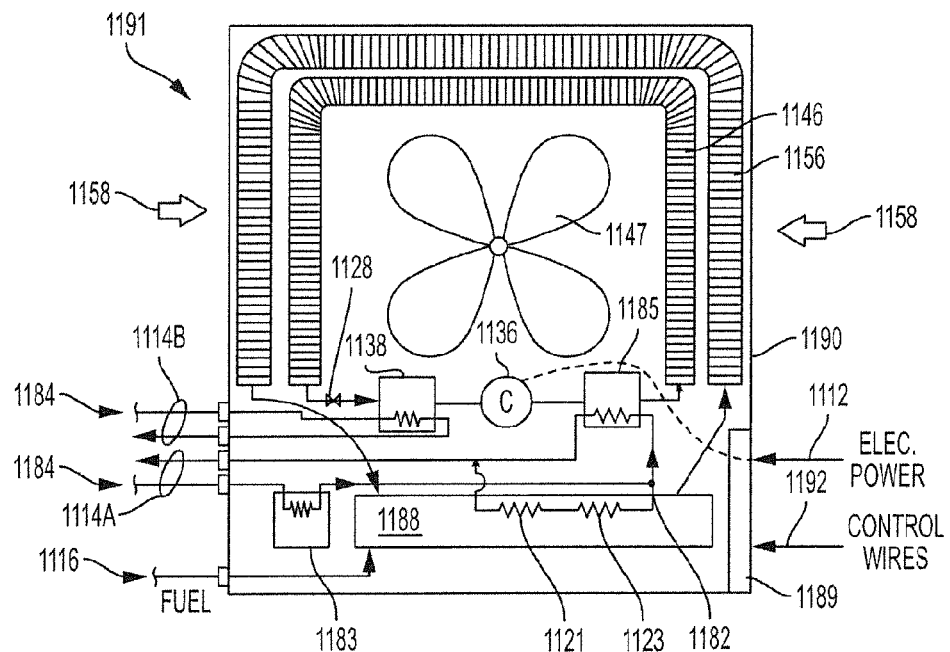
FIG. 11 depicts the top view of the hybrid fossil fuel-electric multifunction heat pump using hydronic loops for both heating and cooling.
Figure 12:
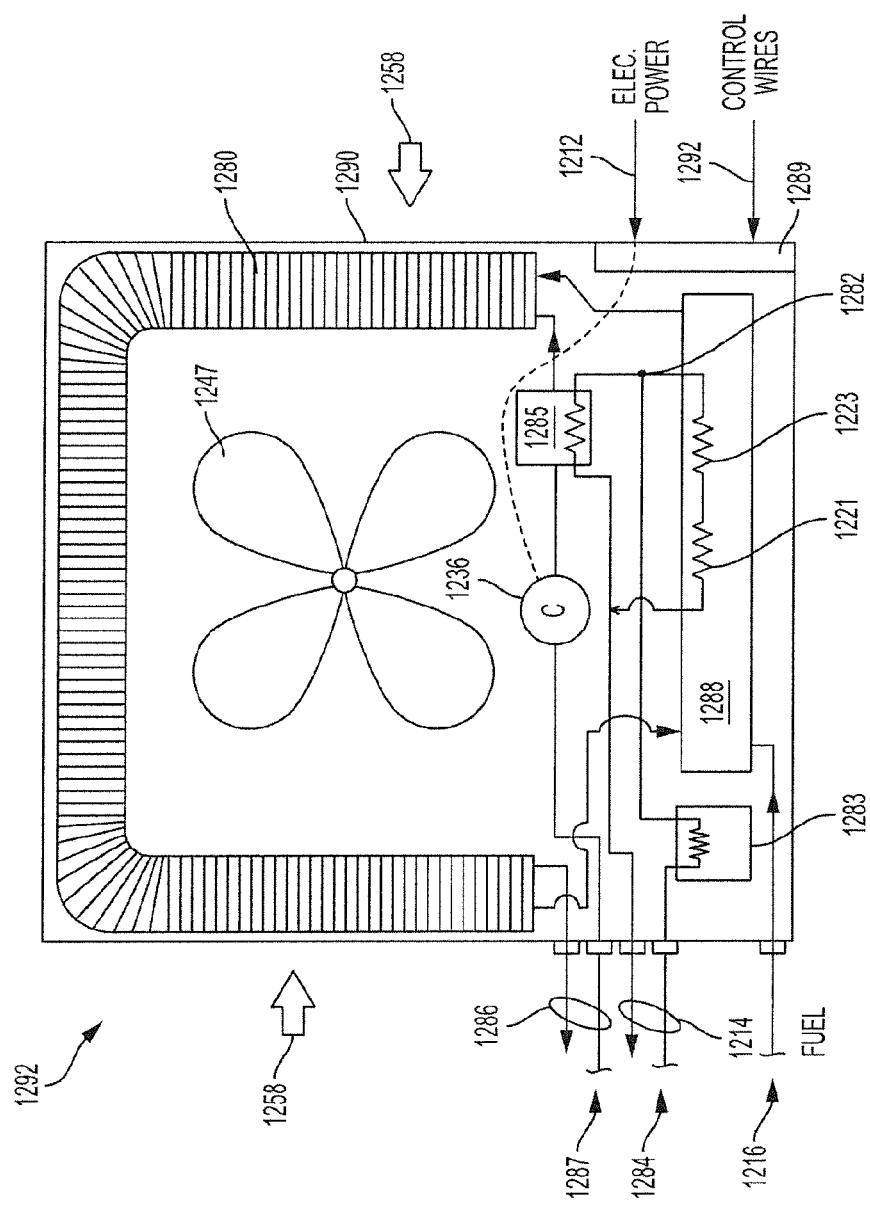
FIG. 12 depicts the top view of the hybrid fossil fuel-electric multifunction heat pump using hydronic loop for heating and a refrigerant loop for cooling.

A hybrid fossil fuel-electric multifunction heat pump packaged system (FIG. 3) may comprise one or more of:
- a thermally activated, air-coupled heat pump system for space and water heating, consisting minimally of a desorber, condenser, evaporator and absorber (FIG. 4),
- an electric powered, air-coupled vapor compression heat pump system, consisting minimally of a compressor, condenser and evaporator (FIG. 5),
- nested (FIG. 6) or integrated (FIG. 7) air-coupled heat exchanger coils (evaporator for sorption system, condenser for vapor compression system) that share a common ambient air fan,
- shared control system for the two heat pump systems,
- a hydronic loop that (FIGS. 8 and 9):
  - passes through a hydronically-coupled absorber, condenser and (optional) condensing heat exchanger of the sorption system, and optionally a refrigerant de-superheater of the vapor compression system, when in heating mode,
  - passes through a hydronically-coupled evaporator of the vapor compression system when in cooling mode,
- a hydronic loop passes through a hydronically-coupled absorber, condenser and (optional) condensing heat exchanger of the sorption system and optionally, a refrigerant de-superheater of the vapor compression system when in heating mode, and a refrigerant loop that passes through the condenser, compressor and optional de-superheater of the vapor compression system (FIG. 10), and
- a single enclosure, installed outdoors adjacent to the building, housing both heat pump systems, with a common connection point for the fossil fuel, electric power, control wiring, hydronic loop(s), and optional refrigerant loop. (FIGS. 11 and 12).

When space or water heating is needed, the sorption system operates, heating the hydronic loop that is connected to heat emitters and/or a water storage tank inside the building. A fan moves ambient air through the nested or integrated evaporator/condenser heat exchanger(s), boiling the sorption cycle refrigerant flowing through the evaporator. A heat transfer fluid in the hydronic loop flows through, and is heated by, the hydronically-coupled condenser, absorber and (optional) condensing heat exchanger of the sorption system.

When cooling is needed, the vapor compression system operates, cooling the hydronic loop that is connected to cooling coils or heat exchangers inside the building. A fan moves ambient air through the nested or integrated evaporator/condenser heat exchanger, condensing the vapor compression cycle refrigerant flowing through the condenser. A heat transfer fluid in the hydronic loop flows through, and is cooled by, the hydronically-coupled evaporator of the vapor compression cycle. Optionally, cooling can be provided by the vapor compression system by directly connecting the compressor and condenser to an evaporator heat exchanger located inside the building using connecting tubes filled with the vapor compression system refrigerant.

When using the all-hydronic option, the hybrid multifunction heat pump could be configured as a "2-pipe" or a "4-pipe" system. In a 2-pipe system (FIG. 8), there is a single hydronic loop that is either heated or cooled based on the building requirement. Either the sorption heat pump or vapor compression heat pump operates at any given time, but in no case do they operate simultaneously. Automatic valves work to direct the heat transfer fluid in the hydronic loop through either the sorption cycle absorber, condenser and optional fossil-fuel gas condensing heat exchanger (heating mode), or through the vapor compression evaporator (cooling mode). The 2-pipe option is simpler and less costly to install, but it is difficult for the sorption system to provide hot water heating during the summer when cooling is required (the vapor compression system has to shut off, interrupting cooling of the building, while the sorption system heats the water storage tank).

In a 4-pipe system (FIG. 9), there are two hydronic loops connected to the hybrid multi-function heat pump. One loop is dedicated to heating, and is connected to the sorption system components. The other loop is dedicated to cooling, and is connected to the vapor compression system components. The 4-pipe option is more costly to install, but allows for the sorption system and vapor compression system to operate simultaneously, allowing the vapor compression system to provide space cooling at the same time the sorption system is providing water heating.

Another advantage of the 4-pipe option is, if the nested or integrated ambient air-coupled evaporator/condenser heat exchanger is configured so that the ambient air first passes through the sorption cycle evaporator, and then through the vapor compression condenser, the evaporator will cool the ambient air before it flows through the condenser, allowing the vapor compression system to operate at a higher efficiency than it would if the sorption system was not operating.

Still another advantage of the 4-pipe option is, if an optional hydronically-coupled refrigerant de-superheater is installed in the vapor compression system at the outlet of the compressor, the heat transfer fluid in the heating only hydronic loop could be directed using a valve to bypass the sorption system components and flow through, and be heated by, the de-superheater, and then used to re-heat a hot water storage tank. Depending on the size and service factor of the vapor compression cooling system, this may minimize the need for the sorption system to provide water heating during the cooling season, reducing energy use and the building utility bills.

Alternatively, cooling can be delivered to the building by the vapor compression system using a refrigerant loop connecting the compressor and condenser heat exchanger to an evaporator heat exchanger(s) located inside the building. With this arrangement (FIG. 10), a hydronic loop is used to collect heat from the sorption system and deliver it to inside the building (similar to 2-pipe arrangement previously described). The advantage of this arrangement is that cooling is provided using the more conventional direct refrigerant loop method and the sorption and vapor compression systems are able to operate simultaneously to provide cooling and water heating. This arrangement is especially advantageous for retrofit installations where heating was provided by a boiler connected to multiple hydronic radiant heat emitters located inside the building that cannot serve the dual purpose of heating and cooling due to condensation generation during cooling.

Figure 2:
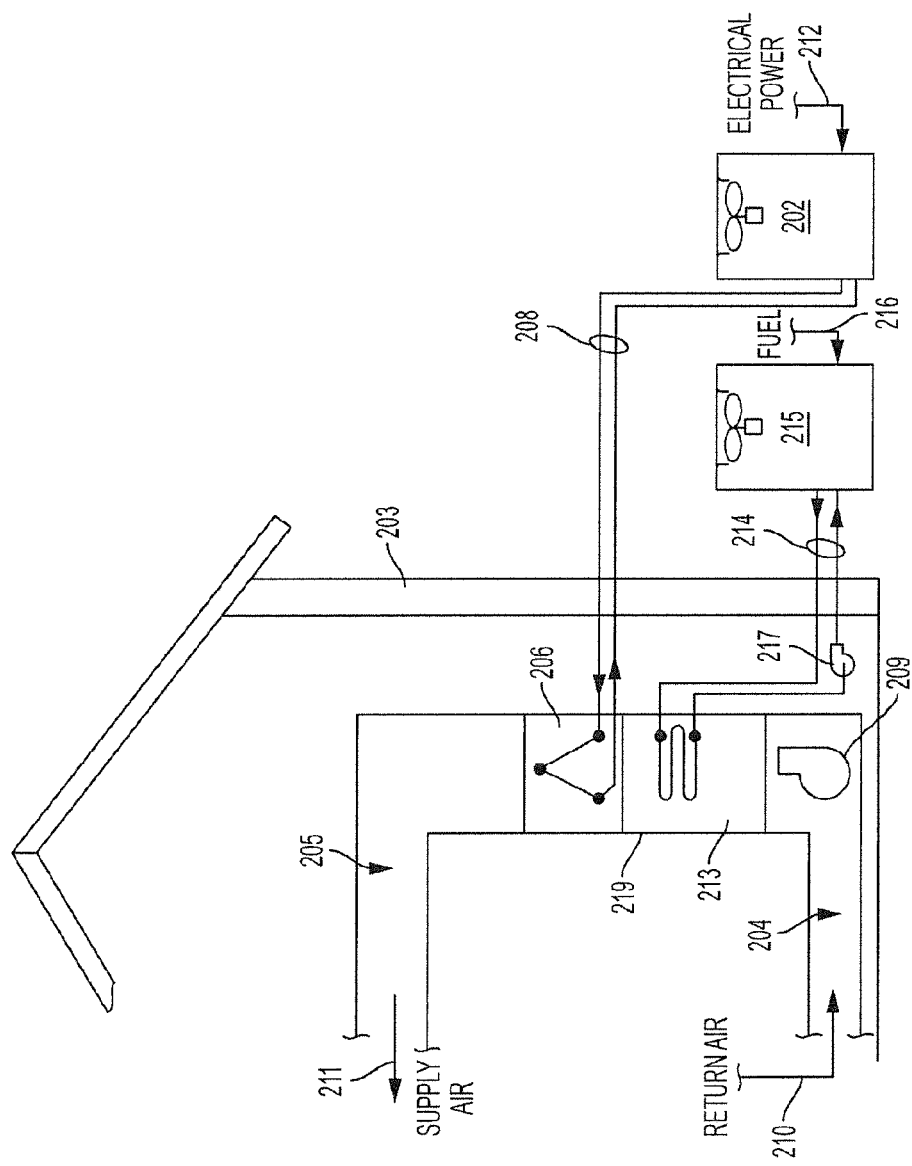
FIG. 2 depicts a heating and cooling system for a building, having a fuel-fired sorption heat pump and an electric air conditioner.
Figure 3:
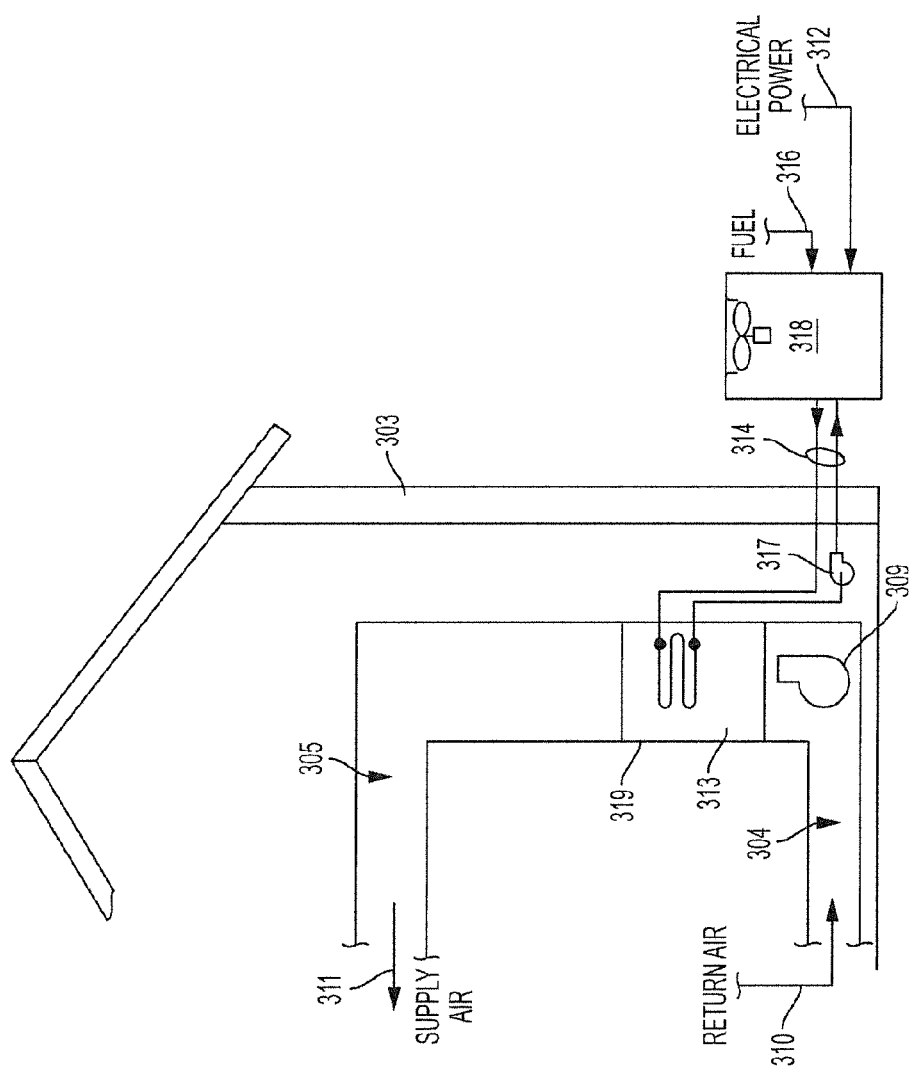
FIG. 3 depicts a heating and cooling system for a building, having a hybrid fossil fuel-electric multi-function heat pump.

Regarding FIGS. 1, 2 and 3, those skilled in the art will understand that a wide variety of configurations can be used on the inside of the building for delivering heating and cooling to the interior space, including the use of multiple air-handlers or fan-coils, radiant heat exchangers or panels located on walls, ceilings or floors, or integrated into the floors, ceilings and walls themselves. Any of these possible configurations are applicable to the hybrid fossil fuel-electric multi-function heat pump application, without loss of function.

A preferred feature of my hybrid multifunction heat pump is the nested or integrated ambient-air coupled evaporator (sorption) and condenser (vapor compression) heat exchangers. This arrangement allows the use of a shared ambient air fan, significantly reducing cost and the overall size of the heating-cooling system.

In the nested arrangement (FIG. 6), the evaporator heat exchanger for the sorption cycle sits adjacent to the condenser heat exchanger for the vapor compression cycle, such that the ambient air propelled by the ambient fan flows first through one heat exchanger and then the other, but the two heat exchangers are physically separate. The physical arrangement is not limited and can be flat, U-shaped, L-shaped, cylindrical, or other geometries that provide the desired overall footprint and performance. The design of the two heat exchangers need not be identical, meaning they can use different tube and fin dimensions, materials, and configurations, controlled for the cycle they are a part of.

In the integrated arrangement (FIG. 7), the evaporator (sorption) and condenser (vapor compression) functions are integrated into a single physical heat exchanger. Although the tubes for the individual functions may vary in diameter or material, they may share a common fin design. The physical arrangement is not limited and can be flat, U-shaped, L-shaped, cylindrical, or other geometries that provide the desired overall footprint and performance. By integrating the two functions (evaporator for sorption and condenser for vapor compression) into a single heat exchanger, the overall size and cost can be reduced compared to the separate (nested) arrangement. Additionally, an integrated coil would be less prone to trapping debris (leaves, grass clippings, seeds from weeds or trees) in the gap between two nested coils, which could reduce performance and efficiency.

For either the nested or integrated arrangement, the preferred air flow configuration is first through the evaporator (sorption) and then through the condenser (vapor compression), although either order of flow will work acceptably. The evaporator first configuration is preferred so that if both the sorption and vapor compression systems are running simultaneously, the evaporator will act to cool the ambient air before it flows through the condenser, allowing the vapor compression system to operate at a higher efficiency.

Referring to the drawings, FIG. 1 depicts a typical heating and cooling system for a building 103, consisting of a fuel-fired furnace 101 and an electric vapor compression air conditioner 102. Furnace 101 is located inside the building 103 and is connected to a return air duct 104, supply air duct 105, evaporator heat exchanger 106, and a fossil fuel supply line 107. The compressor and condenser heat exchanger for the electric vapor compression air conditioner 102 is located outside the building and is connected to the evaporator heat exchanger 106 using tubes containing refrigerant 108 and an electric power source 112. A blower 109 is located adjacent to the furnace 107 and evaporator 106 to force indoor air 110 to be heated or cooled through the return air duct 104, furnace 107, evaporator 106 and supply air duct 105. Heated or cooled supply air 111 delivered to the indoor space.

FIG. 2 depicts a heating and cooling system for a building 203, comprising fuel-fired sorption heat pump 215 and an electric air conditioner 202. The fuel-fired sorption heat pump 215 is located outside the building 203 and is connected to a hydronic heat exchanger 213 located within air duct 219 using a hydronic loop 214 and hydronic pump 217, and fossil-fuel source 216, which may be any combustible fossil fuel such as but not limited to natural gas, propane, methane, fuel-oil or bio-diesel. An electric vapor compression air conditioner 202 also sits outside the building 203, connected to an evaporator heat exchanger 206 located within air duct 219 using a refrigerant loop 208, and an electric power source 212. When heating or cooling is needed, air blower 209 forces indoor air 210 through the return air duct 204, hydronic coil 213, evaporator heat exchanger 206 and supply air duct 205.

FIG. 3 depicts a heating and cooling system for a building 303, comprising a hybrid fossil fuel-electric multi-function heat pump 318. In particular, FIG. 3 depicts the 2-pipe hydronic connection option, although the 4-pipe option or hydronic-refrigerant options depicted in FIGS. 9 and 10 could also be used without a loss in function. The hybrid fossil fuel-electric multi-function heat pump 318 is located outside the building 303 and is connected to a hydronic heat exchanger 313 located within air duct 319 using a hydronic loop 314 and hydronic pump 317, fossil-fuel source 316 and electric power source 312. When heating or cooling is needed, either the sorption or vapor compression system within the hybrid heat pump can be activated and air blower 309 forces indoor air 310 through the return air duct 304, hydronic coil 313, and supply air duct 305. The temperature of the hydronic fluid with hydronic loop 314 is either hot or cold depending upon whether heating or cooling is desired.

Figure 4:
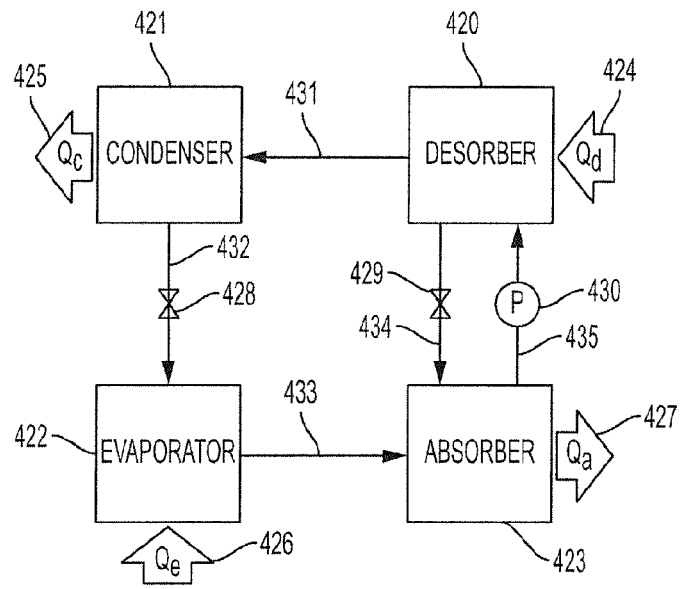
FIG. 4 depicts a simple sorption heat pump cycle having a desorber, condenser, evaporator and absorber.

FIG. 4 depicts a simple sorption heat pump cycle comprising a desorber 420, condenser 421, evaporator 422 and absorber 423. High temperature heat (energy) source 424 (such as from the combustion of a fossil-fuel, solar, or waste heat) causes a refrigerant to boil out of a sorbent in desorber 420 at high pressure. The vapor refrigerant flows to condenser 421 through connecting line 431 where the refrigerant is condensed by removing heat energy 425. The liquid refrigerant flows to the evaporator 422 through connecting line 432 and expansion device 428 in which the refrigerant pressure is reduced so it can evaporate and absorb heat energy 426. The evaporated refrigerant than flows to the absorber 423 where it is absorbed by the sorbent which flows from desorber 420 to the absorber through connecting line 434 and expansion valve 429. The refrigerant-sorbent pair flows back to desorber 420 through connecting line 435 and pump 430, which pressurizes the refrigerant-sorbent pair back to the high pressure. For heating space or water in a building, heat energy 425 and 427 from the condenser 421 and absorber 423 are collected by a hydronic loop which delivers the heat energy to space heat emitters or water storage tank(s) located inside the building. Heat for evaporation of the refrigerant 426 in evaporator 422 can be from outside ambient air.

Figure 5:
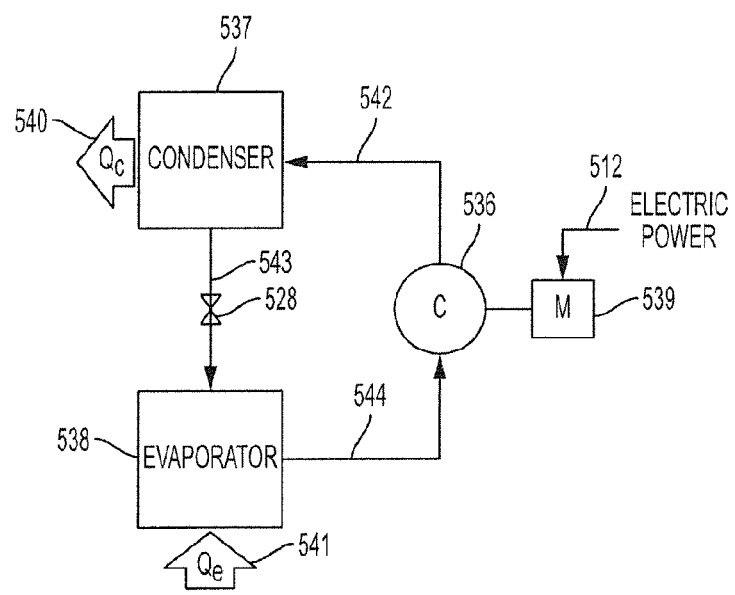
FIG. 5 depicts a simple vapor compression heat pump cycle having a compressor, condenser and evaporator.

FIG. 5 depicts a simple vapor compression heat pump cycle comprising a compressor 536, condenser 537 and evaporator 538. Electric power 512 is used to power a motor 539 which turns compressor 536. Refrigerant vapor at high pressure exits compressor 536 and flows to condenser 537 through connecting line 542, where the refrigerant is condensed by removing heat energy 540. The liquid refrigerant flows to the evaporator 538 through connecting line 543 and expansion device 528 in which the refrigerant pressure is reduced so it can evaporate and absorb heat energy 541. The evaporated refrigerant than flows back to compressor 536 through connecting line 544. For space cooling in a building, heat energy 541 is removed from the building interior through evaporator 538. Heat energy 540 from the condenser 537 is rejected to the outside ambient air.

Figure 6A:
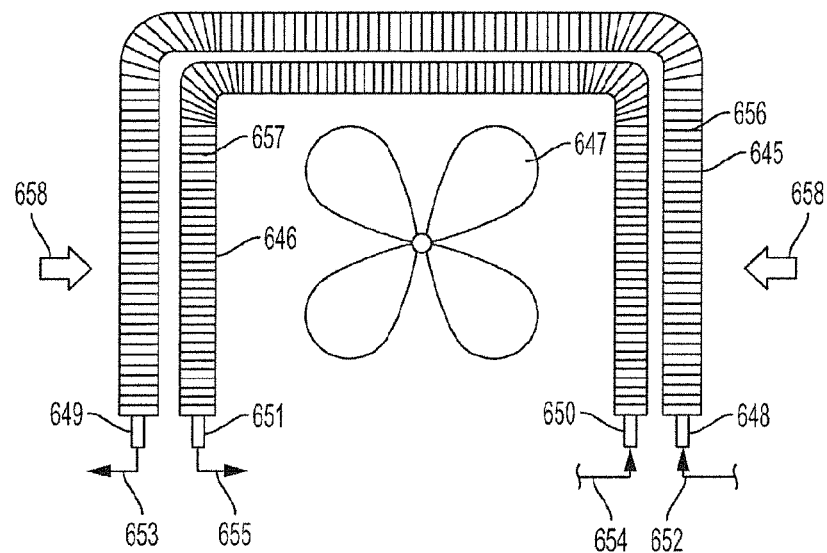
FIGS. 6A and 6B depict nested evaporator (sorption system) and condenser (vapor compression system) heat exchangers sharing the same ambient air fan from a top-view and cross-sectional view, respectively.
Figure 6B:
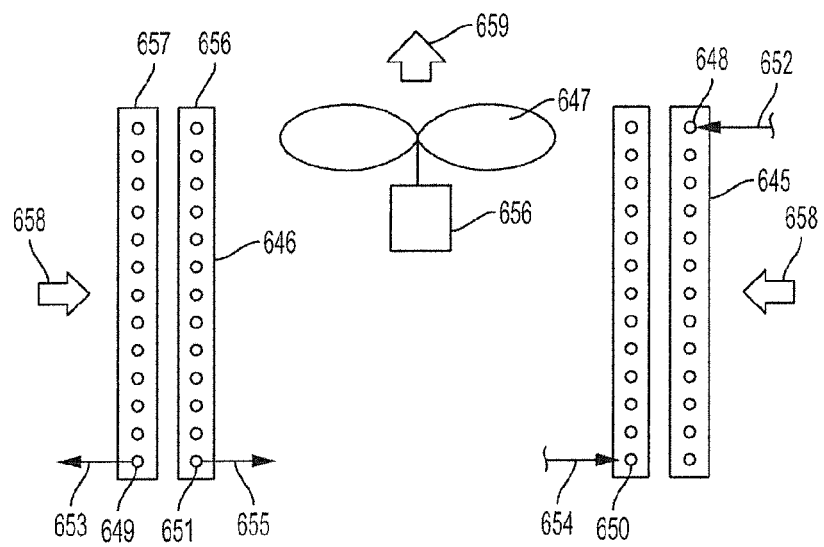

FIGS. 6A and 6B depict nested evaporator 645 (sorption system) and condenser 646 (vapor compression system) heat exchangers sharing the same ambient air fan 647. Both the evaporator 645 and condenser 646 comprise tubes or tube-like structures inside which the refrigerant flows, attached to and surrounded by fins 656, 657 which assist in transferring heat from air 658 flowing through the two heat exchangers. The tubes can be of many possible shapes (not limited to round, flat, or oval) and fabricated from many possible materials (not limited to steel, copper, aluminum, plastic, elastomers). The fins can be of many possible shapes (not limited to flat, wavy, perforated, folded) and fabricated from many possible materials (not limited to steel, copper, aluminum, plastic, elastomers). The tube shape and geometry, as well as the fins, used for condenser 646 does not need to be the same as those used for evaporator 645. Although FIGS. 6A and 6B depict both the evaporator 645 and condenser 646 heat exchangers bent into a "U" shape, the two coils could be flat (not bent), round, oval, "L-shaped" or any other geometry that is desired. Although FIG. 6A depicts air 658 first flowing through evaporator 645 and then condenser 646, the opposite arrangement is possible. Regardless, the two heat exchangers are arranged so that air is pulled through both using the same air-moving device(s) such as fan 647, which may be driven by electric motor 656. Fan 647 moves air 658 through both heat exchangers, where it is either heated or cooled (or both if the sorption and vapor compression systems are operating simultaneously). Although a single air-moving device 647 is shown, multiple air-moving devices may be used if desired, however, it is preferred if all of the air-moving devices move air through both the evaporator 645 and condenser 646 heat exchangers.

Liquid refrigerant 652 at low pressure from the sorption system enters evaporator 645 through entry tube 648, flows through the circuit of tubes and fins, then exits as vapor 653 at exit tube 649. Air 658 flowing around the tubes and heat transfer fins 656 is cooled by the evaporating refrigerant so that air 659 exiting the evaporator is colder than air 658 entering. The circuit of tubes may consist of various arrangements commonly used for evaporator heat exchangers. Optionally, liquid refrigerant 652 entering evaporator 645 may be split and enter multiple entry tubes.

Vapor refrigerant 654 at high pressure from the vapor compression system enters condenser 646 through entry tube 650, flows through the circuit of tubes and fins, then exits as liquid 655 through exit tube 651. Air flowing around the tubes and heat transfer fins 657 is heated by the condensing refrigerant so that air 659 exiting the condenser is hotter than air 658 entering. The circuit of tubes may have various arrangements commonly used for condenser heat exchangers. Optionally, vapor refrigerant 654 entering condenser 646 may be split and enter multiple entry tubes.

Figure 7A:
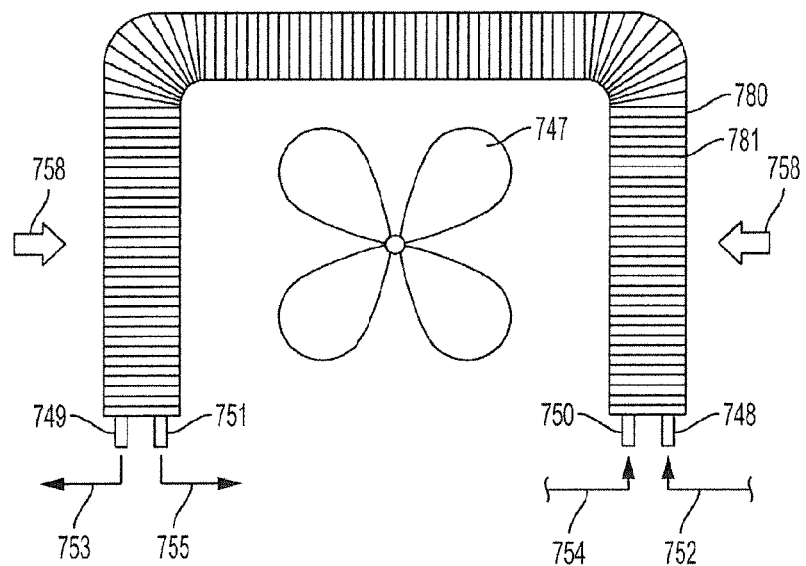
FIGS. 7A and 7B depict an integrated evaporator (sorption system) and condenser (vapor compression system) heat exchangers sharing the same ambient air fan from a top-view and cross-sectional view, respectively.
Figure 7B:
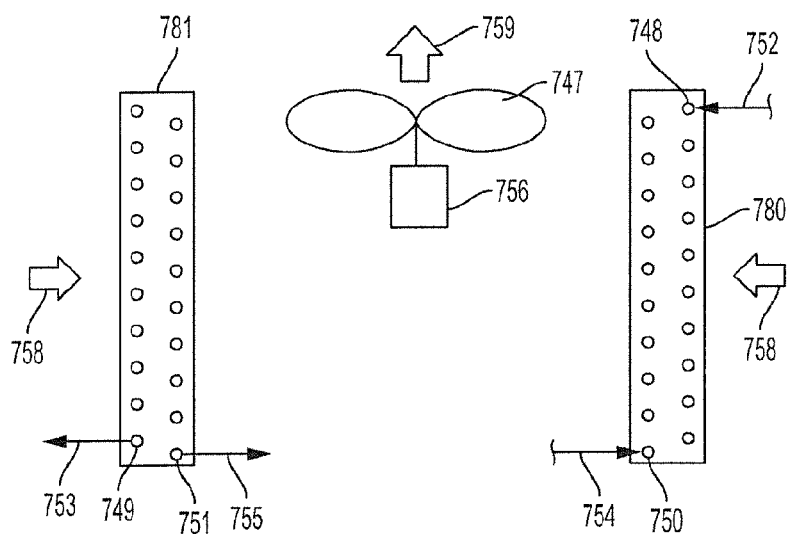

FIGS. 7A and 7B depict an integrated evaporator (sorption system) and condenser (vapor compression system) heat exchanger 780 sharing the same ambient air fan 747. Both the evaporator and condenser consist of tubes or tube-like structures inside which the refrigerant flows, attached to and surrounded by fins 781, which assist in transferring heat from air 758 flowing through the integrated heat exchanger. The tubes can be of many possible shapes (not limited to round, flat, or oval) and fabricated from many possible materials (not limited to steel, copper, aluminum, plastic, elastomers). The fins 781 can be of many possible shapes (not limited to flat, wavy, perforated, folded) and fabricated from many possible materials (not limited to steel, copper, aluminum, plastic, elastomers). Although FIGS. 7A and 7B depict the heat exchanger bent into a "U" shape, the heat exchanger could be flat (not bent), round, oval, "L-shaped" or any other geometry that is desired. The refrigerant containing tubes may be configured so that air 758 first flows over all of the evaporator tubes and then condenser (or vice-versa), or the tubes may be interlaced so that air 758 flows over evaporator and condenser tubes at the same time. Fan 747 moves air 758 through the integrated heat exchanger, where it is either heated or cooled (or both if the sorption and vapor compression systems are operating simultaneously). Although a single air-moving device 747 is shown, multiple air-moving devices may be used if desired.

Liquid refrigerant 752 at low pressure from the sorption system enters heat exchanger 780 through entry tube 748, flows through the circuit of tubes and fins 781, then exits as vapor 753 at exit tube 749. Air 758 flowing around the tubes and heat transfer fins 781 is cooled by the evaporating refrigerant so that air 759 exiting the evaporator is colder than air 758 entering. The circuit of tubes may consist of various arrangements commonly used for evaporator heat exchangers. Optionally, liquid refrigerant 752 entering heat exchanger 780 may be split and enter multiple entry tubes.

Vapor refrigerant 754 at high pressure from the vapor compression system enters integrated heat exchanger 780 through entry tube 750, flows through the circuit of tubes and fins 781, then exits as liquid 755 through exit tube 751. Air flowing around the tubes and heat transfer fins 781 is heated by the condensing refrigerant so that air 759 exiting the condenser is hotter than air 758 entering. The circuit of tubes may consist of various arrangements commonly used for condenser heat exchangers. Optionally, vapor refrigerant 754 entering heat exchanger 780 may be split and enter multiple entry tubes.

Figure 8:
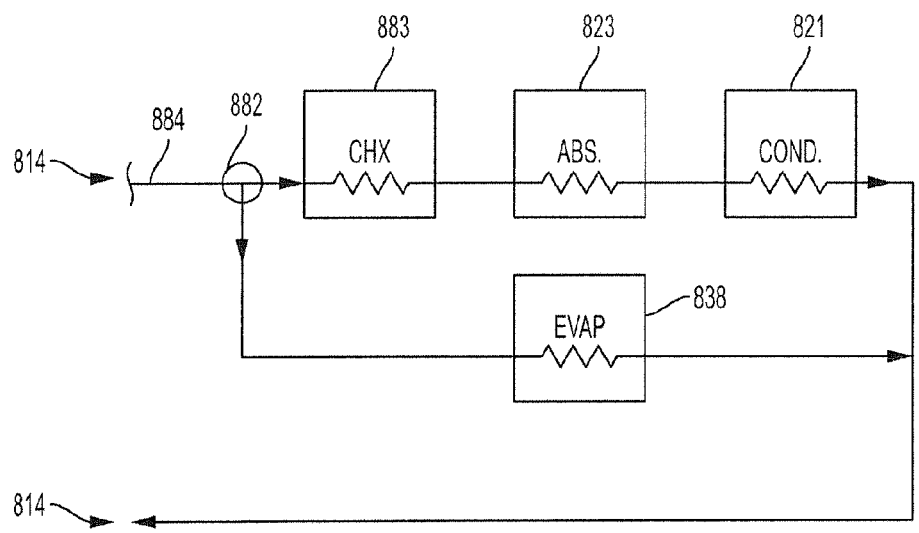
FIG. 8 depicts a hydronic loop of the 2-pipe arrangement that connects the hybrid fossil fuel-electric multifunction heat pump to heat exchangers located inside the building for cooling and/or heating.

FIG. 8 depicts a hydronic loop 814 of the 2-pipe arrangement that connects the hybrid fossil fuel-electric multifunction heat pump to heat exchangers located inside the building for cooling and/or heating. Heat transfer fluid 884 (water or glycol, for example) flowing in hydronic loop 814 returns from inside the building to the hybrid heat pump and first flows through (if in heating mode when sorption system is operating) optional condensing heat exchanger 883 where it cools and condenses flue gases exiting desorber 420, then absorber 823 and condenser 821 (flow order of absorber 823 and condenser 821 may be reversed or heat transfer fluid 884 may be directed through absorber 823 and condenser 821 in parallel). In cooling mode (when vapor compression system is operating), heat transfer fluid 884 flows through evaporator 838. Valve 882 directs the heat transfer fluid to the appropriate heat exchangers depending upon whether heating or cooling is desired.

Figure 9:
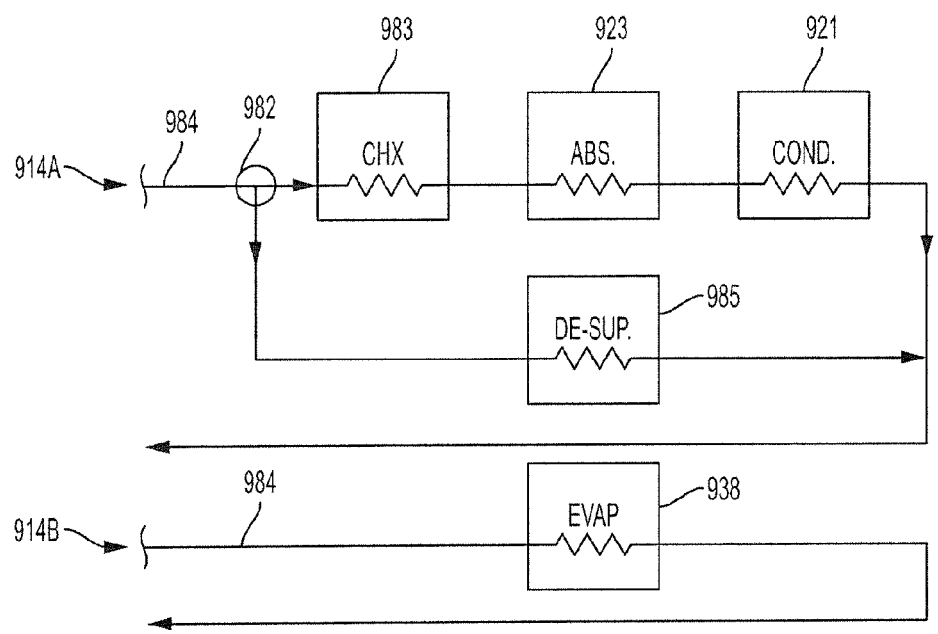
FIG. 9 depicts a hydronic loop of the 4-pipe arrangement that connects the hybrid fossil fuel-electric multifunction heat pump to heat exchangers located inside the building for cooling and/or heating.

FIG. 9 depicts a hydronic loop 914A and 914B of the 4-pipe arrangement that connects the hybrid fossil fuel-electric multifunction heat pump to heat exchangers located inside the building for cooling and/or heating. Heat transfer fluid 984 flowing in hydronic loop 914A returns from inside the building to the hybrid heat pump and first flows through (if in heating mode when sorption system is operating) optional condensing heat exchanger 983 where it cools and condenses flue gases exiting desorber 420, then absorber 923 and condenser 921 (flow order of absorber 923 and condenser 921 may be reversed or heat transfer fluid 984 may be directed through absorber 923 and condenser 921 in parallel). Optionally, if vapor compression system is operating and water heating is desired at the same time, heat transfer fluid 984 may be directed through de-superheater 985 through valve 982. The de-superheater is a heat exchanger located in the vapor compression system, between the compressor 536 outlet and condenser 537 inlet.

Heat transfer fluid 984 is heated in de-superheater 985, while pre-cooling refrigerant vapor prior to entering condenser 537.

In cooling mode (when vapor compression system is operating), heat transfer fluid 984 flows through evaporator 938. For the 4-pipe configuration shown in FIG. 9, both the sorption system (heating) and vapor compression system (cooling) may operate at the same time, where heat transfer fluid 984 flows through both hydronic loops 914A and 914B at the same time.

Figure 10:
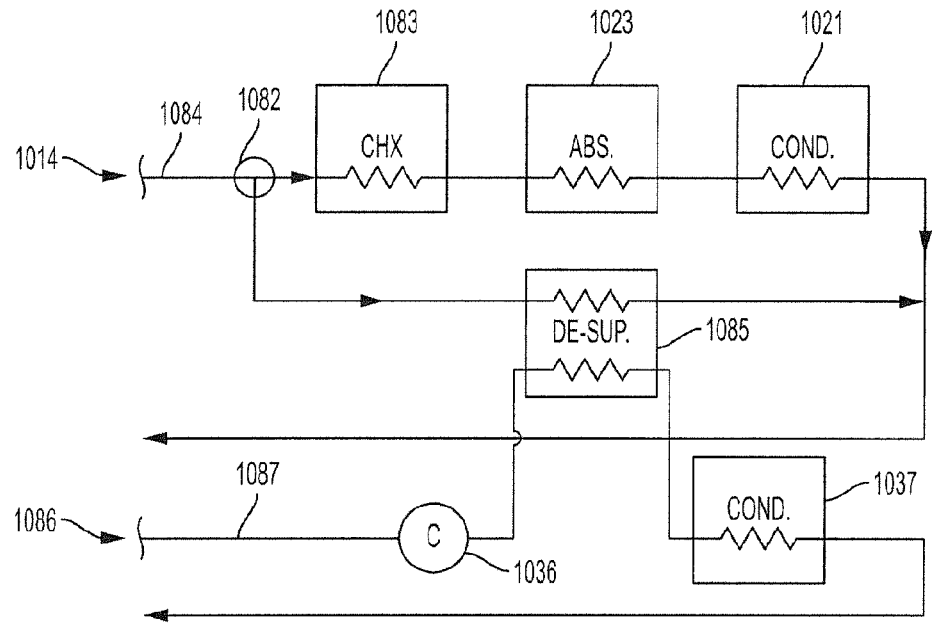
FIG. 10 depicts a hydronic loop of the 2-pipe arrangement that connects the hybrid fossil fuel-electric multifunction heat pump to heat exchanger(s) located inside the building for heating, and a refrigerant loop that connects the hybrid fossil fuel-electric multifunction heat pump to heat exchanger(s) located inside the building for cooling.

FIG. 10 depicts a hydronic loop 1014 of the 2-pipe arrangement that connects the hybrid fossil fuel-electric multifunction heat pump to heat exchanger(s) located inside the building for heating, and a refrigerant loop 1086 that connects the hybrid fossil fuel-electric multifunction heat pump to heat exchanger(s) located inside the building for cooling. Heat transfer fluid 1084 flowing in hydronic loop 1014 returns from inside the building to the hybrid heat pump and first flows through (if in heating mode when sorption system is operating) optional condensing heat exchanger 1083 where it cools and condenses flue gases exiting desorber 420, then absorber 1023 and condenser 1021 (flow order of absorber 1023 and condenser 1021 may be reversed or heat transfer fluid 1084 may be directed through absorber 1023 and condenser 1021 in parallel). Optionally, if vapor compression system is operating and water heating is desired at the same time, heat transfer fluid 1084 may be directed through de-superheater 1085 through valve 1082. The de-superheater is a heat exchanger located in the vapor compression system, between the compressor 1036 outlet and condenser 1037 inlet. Heat transfer fluid 1084 is heated in de-superheater 1085, while pre-cooling refrigerant vapor prior to entering condenser 1037.

In cooling mode (when vapor compression system is operating), refrigerant 1087 returns from evaporator 538 (not shown, located inside building) and flows through condenser 1036, de-superheater 1085 and condenser 1037. For the hydronic-refrigerant configuration shown in FIG. 10, both the sorption system (heating) and vapor compression system (cooling) may operate at the same time, where heat transfer fluid 1084 flows through hydronic loops 1014 and refrigerant 1087 flows through refrigerant loop 1086 at the same time.

FIG. 11 depicts the top view of the hybrid fossil fuel-electric multifunction heat pump 1191 using hydronic loops 1114A and 1114B for heating and cooling (4-pipe configuration), nested evaporator 1156 and condenser 1146 heat exchangers, and all sorption and vapor compression system components inside a single enclosure 1190. Alternatively, FIG. 11 could show integrated heat exchanger 780 in place of the nested arrangement with equivalent function. Fan 1147 forces ambient air 1158 through the evaporator 1156 and condenser 1146 heat exchangers. Connected to the hybrid heat pump assembly is electric power 1112 and control wires 1192 which are routed to shared system controller 1189, fossil-fuel source 1116, and the two hydronic loops 1114A and 1114B. Heat transfer fluid 1184 flows though hydronic loops 1114A and 1114B in the fashion described in FIG. 9. Alternatively, FIG. 11 could show the 2-pipe hydronic configuration described in FIG. 8. For clarity, sorption system components are shown collectively as 1188.

FIG. 12 depicts the top view of the hybrid fossil fuel-electric multifunction heat pump 1292 using hydronic loop 1214 for heating and a refrigerant loop 1286 for cooling, integrated heat exchanger 1280, and all sorption and vapor compression system components inside a single enclosure 1290. Alternatively, FIG. 12 could show nested evaporator 1156 and condenser 1146 in place of the integrated heat exchanger 1280 with equivalent function. Fan 1247 forces ambient air 1258 through the integrated heat exchanger 1280. Connected to the hybrid heat pump assembly is electric power 1212 and control wires 1292 which are routed to shared system controller 1289, fossil-fuel source 1216, and the hydronic loops 1214. Heat transfer fluid 1284 flows though hydronic loops 1214 and refrigerant 1287 flows through refrigerant loop 1286 in the fashion described in FIG. 10. Alternatively, FIG. 12 could show the 2-pipe or 4-pipe hydronic configurations described in FIGS. 8 and 9. For clarity, sorption system components are shown collectively as 1288.

I claim:

1. A heating and cooling system for a building having a hybrid fossil fuel-electric multifunction heat pump comprising:
    a thermally activated sorption heat pump system for space and/or water heating comprising at least a desorber, condenser, evaporator and absorber,
    an electric-powered vapor compression heat pump system comprising at least a compressor, condenser and evaporator, and
    an air-moving device that causes outdoor ambient air to flow in series over both the evaporator of the sorption heat pump system and condenser of the vapor compression heat pump system
    wherein the sorption system and the vapor compression heat pump system are configured to operate in a simultaneous mode and an alternate mode, and
    the air-moving device causes outdoor ambient air to flow through the evaporator of the sorption heat pump system, then flow through the condenser of the vapor compression heat pump system, then flow back to the outdoor ambient air,
    the outdoor ambient air transfers heat to the evaporator of the sorption heat pump system when operating in a heating mode, the condenser of the vapor compression heat pump system transfers heat to the outdoor ambient air when operating in a cooling mode, and the evaporator of the sorption heat pump system cools the outdoor ambient air before the outdoor air is heated by the condenser of the vapor compression heat pump when operating in a simultaneous mode.

2. The heating and cooling system of claim 1, wherein the evaporator of the sorption heat pump system and the condenser of the vapor compression heat pump system are nested with each other.

3. The heating and cooling system of claim 1, wherein the evaporator of the sorption heat pump system and the condenser of the vapor compression heat pump system are integrated with each other.

4. The heating and cooling system of claim 1, wherein the hybrid fossil fuel-electric multifunction heat pump connects to heating and cooling unit(s) located inside the building via a hydronic loop system that conveys a heat transfer fluid between the hybrid fossil fuel-electric multifunction heat pump and the heating and cooling unit(s) located inside the building, the hydronic loop system having at least a hydronically-coupled first loop that conveys the heat transfer fluid though (1) a line comprising the absorber and the condenser of the sorption heat pump system when in heating mode and (2) the evaporator of the vapor compression heat pump system when in cooling mode.

5. The heating and cooling system of claim 4, wherein the evaporator of the vapor compression heat pump system is positioned in a line that by-passes the sorption heat system.

6. The heating and cooling system of claim 4, wherein, the hydronically-coupled first loop further conveys the heat transfer fluid though a condensing heat exchanger of the sorption heat pump system when in heating mode.

7. The heating and cooling system of claim 1, wherein the hybrid fossil fuel-electric multifunction heat pump connects to heating and cooling unit(s) located inside the building via a hydronic loop system that conveys a heat transfer fluid between the hybrid fossil fuel-electric multifunction heat pump and the heating and cooling unit(s) located inside the building, the hydronic loop system having (1) a hydronically-coupled first loop that conveys the heat transfer fluid though a line comprising the absorber and the condenser of the sorption heat pump system when in heating mode, and (2) a hydronically-coupled second loop that conveys the heat transfer fluid though a line comprising the evaporator of the vapor compression heat pump system when in cooling mode.

8. The heating and cooling system of claim 7, wherein, the hydronically-coupled first loop further conveys the heat transfer fluid though a condensing heat exchanger of the sorption heat pump system when in heating mode.

9. The heating and cooling system of claim 7, wherein, when in cooling mode and simultaneous water heating is desired, the hydronically-coupled first loop conveys the heat transfer fluid though a de-superheater of the vapor compression heat pump system positioned in a line that by-passes the sorption heat system.

10. The heating and cooling system of claim 1, wherein the sorption heat pump system is powered by the combustion heat of a fossil fuel.

11. The heating and cooling system of claim 1, further comprising a shared control system that controls the sorption system and the vapor compression heat pump systems.

12. The heating and cooling system of claim 1, wherein the desorber, the condenser, the evaporator and the absorber of the sorption heat pump system and the compressor and condenser of the vapor compression heat pump system are housed within a single enclosure installed outside of the building.

13. The heating and cooling system of claim 12, wherein the single enclosure further comprises the evaporator of the vapor compression heat pump system.

14. The heating and cooling system of claim 1, wherein the vapor compression heat pump system and sorption heat pump system are connected to heating and cooling loads via a fully hydronic system.

* * * * *